United States Patent
Veltel et al.

(10) Patent No.: US 10,384,390 B2
(45) Date of Patent: Aug. 20, 2019

(54) MELT-GUIDING CONNECTION ADAPTER

(71) Applicants: GALA INDUSTRIES, INC., Eagle Rock, VA (US); Juergen Veltel, Kevelaer (DE); Matthias Berrendorf, Xanten (DE)

(72) Inventors: Juergen Veltel, Kevelaer (DE); Matthias Berrendorf, Xanten (DE)

(73) Assignee: GALA INDUSTRIES, INC., Eagle Rock, VA (US)

( * ) Notice: Subject to any disclaimer, the term of this patent is extended or adjusted under 35 U.S.C. 154(b) by 0 days.

(21) Appl. No.: 15/774,204

(22) PCT Filed: Nov. 24, 2016

(86) PCT No.: PCT/EP2016/001979
§ 371 (c)(1),
(2) Date: May 7, 2018

(87) PCT Pub. No.: WO2017/148493
PCT Pub. Date: Sep. 8, 2017

(65) Prior Publication Data
US 2018/0326643 A1    Nov. 15, 2018

(30) Foreign Application Priority Data
Mar. 4, 2016  (DE) .................... 20 2016 001 455 U (51) Int. Cl.
*B29C 47/00*    (2006.01)
*B29C 47/08*    (2006.01)
(Continued)

(52) U.S. Cl.
CPC ............ *B29C 48/256* (2019.02); *B29B 9/065* (2013.01); *B29C 48/03* (2019.02)

(58) Field of Classification Search
CPC ............ B29C 47/0014; B29C 47/0066; B29C 47/0085
See application file for complete search history.

(56) References Cited

U.S. PATENT DOCUMENTS 10,124,523 B2 * 11/2018 Fridley ................... B29B 9/065
2006/0105072 A1   5/2006 Hughes
(Continued)

FOREIGN PATENT DOCUMENTS

DE        195 09 375 A1    9/1996
DE    20 2005 001809 U1    4/2005
(Continued)

OTHER PUBLICATIONS

Galvisi-Carreno et al. Efficient reconstruction of Rama imaging based on compressive sensing. In: DYNA 81 (188), pp. 116-124, Dec. 2014.

*Primary Examiner* — Joseph S Del Sole
*Assistant Examiner* — Thu Khanh T Nguyen
(74) *Attorney, Agent, or Firm* — Jacobson Holman, PLLC.

(57) ABSTRACT

The present invention relates to a connection adapter for connecting two melt-guiding components having two adapter halves having connection means for connection to a respective one of the components and having connection means for connecting the two adapter halves to one another and having a melt-guiding piece that is adapted to a first of the melt-guiding components by a first opening cross-section and to the second of the melt-guiding components by a second opening cross-section. The invention furthermore relates to a melt processing plant having two melt-guiding components such as an extruder and a pelletizer that are connected to one another by such a connection adapter. In accordance with the invention, the melt-guiding piece is (Continued)

formed separately from the adapter halves and is tensionable against the melt-guiding components by the mutually connected adapter halves.

25 Claims, 3 Drawing Sheets

(51) Int. Cl.
*B29C 47/30* (2006.01)
*B29C 48/25* (2019.01)
*B29B 9/06* (2006.01)
*B29C 48/03* (2019.01)

(56) References Cited

U.S. PATENT DOCUMENTS

2007/0264379 A1 11/2007 Broughman
2015/0226355 A1 8/2015 Ungchusri

FOREIGN PATENT DOCUMENTS

| | | |
|---|---|---|
| DE | 20 2013 103 050 U1 | 5/2005 |
| DE | 10 2009 057 781 A1 | 6/2011 |
| EP | 0 894 594 A2 | 2/1999 |
| EP | 1 174 244 A1 | 1/2002 |
| GB | 2 017 571 A | 10/1979 |

* cited by examiner

MELT-GUIDING CONNECTION ADAPTER

The present invention relates to a connection adapter for connecting two melt-guiding components having two adapter halves each having connection means for connection to a respective one of the components and having connection means for connecting the two adapter halves to one another and having a melt-guiding piece that is adapted to a first of the melt-guiding components by a first opening cross-section and to the second of the melt-guiding components by a second opening cross-section. The invention furthermore relates to a melt processing plant having two melt-guiding components such as an extruder and a pelletizer that are connected to one another by such a connection adapter.

As a rule in melt-guiding plant, different components or members of the plant that have melt connectors differing from one another in cross-section contour and/or in cross-section dimensioning have to be connected to one another in a melt-guiding manner. They can, for example, be the extruder and the underwater pelletizer of a plastic pelletizing plant. Pumps for conveying the melt are sometimes also connected to a melt generator or start-up valves are installed in the feed line to the pelletizer to lead off melt not capable of pelletization or screen changers are connected. Different melt-guiding components that are to be connected to one another can also be used in dependence on the melt-processing plant.

To be able to connect such melt-guiding components to one another in a melt-guiding manner, melt-guiding connection adapters are typically used whose inner contour guiding the melt establishes the transition between the melt connectors of the two components often differing in cross-section. On the one hand, the melt connectors of the two components can have diameters that differ from one another so that the melt-guiding channel of the connection adapter has to taper or flare to reduce flow resistances and to avoid flow disturbance point at which melt can collect and cool. On the other hand, different cross-section contours sometimes also have to be led over and into one another, for example a circular cross-section contour at the one component into an oval, elliptical or also hexagonal or octagonal cross-section contour at the other component.

Such connection adapters can be formed in one part or in multiple parts. One-part adapters can be produced simply as a rule, but have disadvantages with respect to handling, flexibility of use and repair-friendliness. The whole adapter has to be replaced on damage to the melt channel e.g. due to corrosion whose formation is promoted by different plastic melts. On the other hand, a fast separation of the two melt-guiding components is not simply possible since the fit connections and bolt closures between the connection adapter and at least one the components have to be released for this purpose. Furthermore, one-part connection adapters are as a rule custom-made products or solutions for a specific installation situation that is no longer suitable when, for example, the spacing of the melt-guiding components from one another has to be changed or one of the two components to be connected has to be replaced with another component. In addition, there is the fact that a heating has to be provided depending on the construction length of the connection adapter and on the melt to be conveyed. If it is found during production that the melt channel of the connection adapter is not suitable for the melt, a new adapter has to be obtained.

Using multipart adapters has therefore already been contemplated that can comprise two adapter halves that can, on the one hand, be connected to a respective one of the components and can, on the other hand, be connected to one another. The significant advantage of such a multipart connection adapter is that the adapter halves can be separated from one another with a few worksteps and the two melt-guiding components connected by the connection adapter can be decoupled from one another. However, it has currently been the case with such multipart adapters that at least one adapter half, if not both adapter halves, have to be replaced in the event of damage in the melt channel. The flexibility of use is furthermore limited. If one of the melt-guiding components is replaced, the associated adapter half typically also has to be exchanged since its melt-guiding channel no longer matches the new melt-guiding component with respect to its cross-section contour and cross-section dimensioning.

It is the underlying object of the present invention to provide an improved melt-guiding connection adapter which avoids disadvantages of the prior art and further develops the latter in an advantageous manner. A connection adapter should in particular be provided that is simple to install and to produce, that enables a process-optimized connection of two melt-guiding components, that is service friendly and repair friendly, and that has a high flexibility of use.

The named object is achieved in accordance with the invention by a connection adapter in accordance with claim 1 as well as by a melt-processing plant having such a connection adapter in accordance with claim 24. Preferred embodiments of the invention are the subject of the dependent claims.

It is therefore proposed to separate the flow-guiding function from the mechanical connection function and to implement it by separate construction elements. In accordance with the invention, the melt-guiding piece is formed separately from the adapter halves and is tensionable against the melt-guiding components by the mutually connected adapter halves. The adapter halves thus serve the mechanical connection of the two components to one another and the positioning and fastening of the melt-guiding piece to the two components; the melt flow connection between the two components, however, is effected by the separate melt-guiding piece. The named melt-guiding piece can in this respect be clamped, in particular axially, between the two melt-guiding components by the adapter halves, i.e. the adapter halves tension the two components axially against the end faces of the melt-guiding piece. Not only a stable mechanical connection of the two components to one another can hereby be achieved, but also a tight transition of the melt connectors of the two components to the melt-guiding piece. In the event of damage by corrosion, for example, the melt-guiding piece releasable from the adapter halves can be replaced, while the adapter halves can be reused. This also applies when one of the melt-guiding components is replaced and a different cross-section transition is required. Furthermore, each component can be adapted to its needs in functionally the best possible manner by the separation of the melt-guiding piece from the adapter halves, in particular with respect to material selection, dimensioning and geometry. A better thermal decoupling of the melt-guiding channel or melt-guiding pieces from the adapter halves can in particular also be achieved so that a faster heating of the melt-guiding channel and fewer heat losses over the adapter halves can be achieved.

In an advantageous further development of the invention, the adapter halves can together form a sleeve that surrounds the melt-guiding piece. Not only the melt-guiding piece is protected from mechanical and thermal influences from the environment by a sleeve-like sheathing of the melt-guiding piece by the adapter halves, but above all a tensioning of the components against the melt-guiding piece uniform over the periphery of the melt-guiding piece can be achieved.

To achieve an exact positioning of the melt-guiding piece relative to the melt connectors of the two components to be connected, at least one centering surface can be provided to center the melt-guiding piece relative to the components to be connected and/or relative to the adapter halves. Such a centering surface can comprise a peripheral fitting surface pair that provides a peripheral fitting surface at one adapter half or at one of the components by which a peripheral surface of the melt-guiding piece can be brought into engagement in a centering manner. The named centering surface at which the melt-guiding piece is centered can in this respect be provided at one of the adapter halves or at the component itself to which the melt-guiding piece is connected.

In this respect, such a centering surface can advantageously be provided for each end section of the melt-guiding piece to connect both opening sections of the melt-guiding piece with an exact fit or in a centered manner to the respective melt-guiding component or its melt connector. The centering surfaces can in this respect both be provided at the adapter halves or both can be formed directly at the components to be connected themselves or a mix thereof can be provided, i.e. one centering surface can be provided directly at the melt-guiding component to be connected itself while the centering surface for the oppositely disposed end section of the melt-guiding piece can be provided at the adapter half there.

In an advantageous further development of the invention, an air gap and/or a thermal insulation can be provided between the adapter halves or the sleeve formed by them together, on the one hand, and the melt-guiding piece, on the other hand, to reduce a heat transfer between the melt-guiding piece and the adapter halves and in particular to prevent too much heat from being withdrawn from the melt-guiding channel via the adapter halves. The melt channel or the melt-guiding piece can be heated considerably faster by such a thermal insulation or by an air gap, whereby start-up procedures can be shortened and a heating can optionally be omitted or a heating with a smaller power can be sufficient. The provision of a heating is optional and substantially depends on the required length of the melt-guiding piece and the technical conditions of use. Alternatively or additionally to the named air gap or thermal insulation between the melt-guiding piece and the adapter halves, the melt-guiding piece can optionally itself be formed as thermally insulated, for example by a multilayer design or by a sheathing or a thermally insulating coating.

Once the melt-guiding piece has been centered in the above-explained manner to one or both of the adapter halves, the named air gap or toe thermal insulation can at least be provided in those regions that are no in centering engagement with one another, with an air gap and/or a thermal insulation preferably being able to be provided substantially over the total length of the melt-guiding piece and the adapter halves—with the exception of the named centering engagement sections. A thermal insulation is optionally also possible in the region of the centering engagements, for example by a thermally insulating coating of the melt-guiding piece.

Alternatively or additionally to a thermal insulation of the adapter halves with respect to the melt-guiding piece, the adapter halves can also be thermally insulated against one another, with an air gap and/or a thermal installation being able to be provided, for example, between the adapter halves to prevent or reduce a heat transfer from one adapter half to the other adapter half and thus from one component guiding the melt to the other component guiding the melt.

The connection means for connecting the two adapter halves to one another can generally be configured differently, with the connection means advantageously being able to configured in a shape-match and/or force-fitting manner. An exact desired positioning of the two adapter halves relative to one another can advantageously be enforced by shape-matched connection means. A tensioning of the melt-guiding components against the melt-guiding piece can be enforced by a force-fitting design of the connection means.

In an advantageous further development of the invention, the named connection means for connecting the adapter halves to one another can comprise a wedge bead at the peripheral side at the two adapter halves and a tensioning ring tensionable to the named wedge bead. If the named tensioning ring is tensioned onto the wedge bead, the two adapter halves can held both axially and radially relative to one another.

The named wedge bead at the peripheral side at the adapter halves can in this respect comprise two wedge bead halves of which one is formed at the one adapter half and the other is formed at the other adapter half, with the two wedge bead halves being arranged adjacent to one another with a mutual alignment of the adapter halves in accordance with their intended purpose back to back with one another with wedge surfaces facing away from one another. If the named tensioning ring is tensioned onto the two wedge bead halves, the wedge bead halves and thus the adapter halves are aligned radially with one another, on the one hand, and are tensioned axially against one another, on the other hand, i.e. the wedge bead halves are drawn or pressed onto one another back to back.

The wedge bead at the peripheral side at the adapter halves can in this respect form a radially outwardly projecting flange that can be formed in annular circumferential manner or as a part ring or in the form of ring segments. The named wedge bead can in this respect extend in a plane that can be aligned substantially perpendicular to the longitudinal axis of the connection adapter and/or to the longitudinal axis or the direction of flow of the melt-guiding piece.

The wedge flanks of the wedge bead sloping toward opposite sides can in this respect—viewed in cross-section—form substantially planar wedge flanks inclined at an acute angle. Alternatively to planar wedge flanks, the named wedge flanks can, however, also be slightly curved, for example—observed in cross-section slightly concavely or convexly curved. A merely stepped contour or a contour of the wedge bead formed as rectangular in cross-section can also be considered depending on the contour of the tensioning ring.

The named tensioning ring that can be tensioned onto the wedge bead advantageously has a wedge surface groove at the inner peripheral side that can be placed onto the wedge bead of the adapter halves and that can be wedged or tensioned by drawing together the tensioning ring with the wedge bead such that the radially acting tensioning force of the tensioning ring—at least also—generates an axial force on the wedge bead halves that tensions the wedge bead halves against or toward one another.

The tensioning ring can be formed as divided or slit. Independently of this, the tensioning ring can be formed as peripherally and/or diametrically changeable to be able to be tensioned onto the wedge bead of the adapter halves.

The aforesaid wedge surface groove of the tensioning ring at the inner peripheral side can—viewed in cross-section—have different contours, for example two planar wedge flanks inclined at an acute angle toward one another. The wedge surface groove is advantageously adapted contour-wise to the wedge bead at the adapter halves, and is in particular formed complementary thereto.

The tensioning ring can advantageously have fastening means by means of which the tensioning ring can be fastened to one or both of the melt-guiding components. The fastening means can comprise a pin connection, for example.

The connection means of the adapter halves for connection to a respective one of the melt-guiding components can likewise be formed differently, in particular in a shape-matched and/or force-fitting manner. The named connection means can advantageously comprise stud bolt connections by means of which the adapter halves can be screwed at the front face against a respective one of the melt-guiding components. The connection means can in this respect also comprise centering and/or fitting means by means of which the connection halves can be centered and/or aligned with an exact fit at the respective melt-guiding component. They can, for example, be aligning pins that can be provided between a respective adapter half and the associated component. Alternatively or additionally, they can also be fitting contours such as centering projections and centering cut-outs.

These components can be individually optimized with respect to their material properties due to the separate design of the melt-guiding piece from the adapter halves. Provision can be made in a further development of the invention that the adapter halves, on the one hand, and the melt-guiding piece, on the other hand, are produced from different materials having different coefficients of material expansion, which can be used to improve the tensioning or sealing of the melt-guiding piece against the melt-guiding components to be connected. The melt-guiding piece can, for example, be produced from one or more materials having a larger thermal coefficient of expansion overall than the adapter halves so that the melt-guiding piece expands more than the adapter halves on heating—for example by the melt flowing through. The greater thermal expansion of the melt-guiding piece results in an additional clamping or tensioning of the melt-guiding piece against the melt-guiding components and, optionally, also against the adapter halves, if centering surfaces are provided there.

Alternatively or additionally, the melt-guiding piece itself can also consist of different materials having different thermal coefficients of expansion and/or can comprise different sections that have different materials of different thermal coefficients of expansion.

The separate design of the melt-guiding piece also allows the same adapter halves to be combined with different melt-guiding pieces, for example allows melt-guiding pieces of different diameter to be used, depending on which diameter the melt channels of the components to be connected have, with the named components nevertheless being able to be connected to one another by the same adapter halves.

Alternatively or additionally, it is also possible selectively to use melt-guiding pieces having melt probes or melt-guiding pieces without melt probes, with such melt probes, for example, being able to be temperature probes or pressure probes or mass flow detectors. A plurality of melt probes can optionally also be provided at a melt-guiding piece. The at least one melt probe can in this respect be integrated in the melt-guiding piece. Alternatively or additionally, the melt-guiding piece can also have a probe cut-out into which a probe can be inserted as required or, optionally, also into which a closure plug can simply be inserted.

To be able to use the adapter halves both for melt-guiding pieces having melt probes and for melt-guiding pieces without melt probes, at least one of the adapter halves can have a cut-out for leading through a melt probe and/or a signal line connected thereto. For example, one adapter half can have a cut-out in the form of an elongate hole or of a longitudinal silt through which a part of the melt probe and/or a signal line connected thereto can extend.

Such a melt probe can advantageously also be retrofitted without having to replace both adapter halves for this purpose or without having to use a completely redesigned connection adapter.

The melt-guiding piece can form a pipe sleeve piece viewed overall in a further development of the invention that has a central melt-guiding channel. Independently of the outer contour or of the body formation of the melt-guiding piece, the melt-guiding channel of the melt-guiding piece forms a transition between the two opening cross-sections of the melt-guiding piece that is as harmonious as possible, with said two opening cross-sections advantageously being shaped-matched or dimensionally matched to the opening cross-sections of the melt connectors of the two components to be connected. The melt-guiding channel can accordingly taper or flare, for example flare conically or also taper slightly in the manner of a funnel. Conical and/or cylindrical and/or other types of melt channel transitions from the melt-guiding channel can be implemented in this respect depending on the design of the connector contours of the melt connectors of the components. Such other types of melt channel transitions can, for example, be transitions from round cross-sectional contours to angled cross-sectional contours or from circular contours to oval contours or general transitions between cross-sectional contours differing from one another in shape.

Alternatively or additionally, the melt-guiding piece can be configured to compensate a vertical and/or lateral or transverse offset between the two components to be connected or the melt channels provided therein. The melt-guiding piece can in particular have two mutually eccentrically offset openings sections. If the two perpendicular bisectors are looked at that pass through the center of the opening cross-sections perpendicular to the cross-sectional surface, these two straight bisectors are mutually eccentrically offset.

This eccentric transverse offset of the opening cross-sections can be achieved in different manners, for example by a melt-guiding piece section that is cropped or that extends in a slightly S shape. Alternatively or additionally, the desired transverse offset for compensating vertical differences or transverse offset differences of the melt channels to be connected can also be compensated in that the ends of the melt-guiding piece are cut to length oppositely and obliquely to the longitudinal axis of the melt-guiding piece or in that the melt-guiding piece has opening cross-sections or connector cross-sections that extend in planes that may admittedly be in parallel with one another, but are angled obliquely to the longitudinal axis of the melt-guiding piece.

To permit such a transverse offset of the melt-guiding piece, the adapter halves can, for example, be formed sufficiently large to provide sufficient clearance radially for such a transverse offset. Alternatively or additionally, at least one of the adapter halves can itself also be formed with a corresponding eccentric offset.

The invention will be explained in more detail in the following with respect to preferred embodiments and to associated drawings. There are shown in the drawings.

Figure 1:
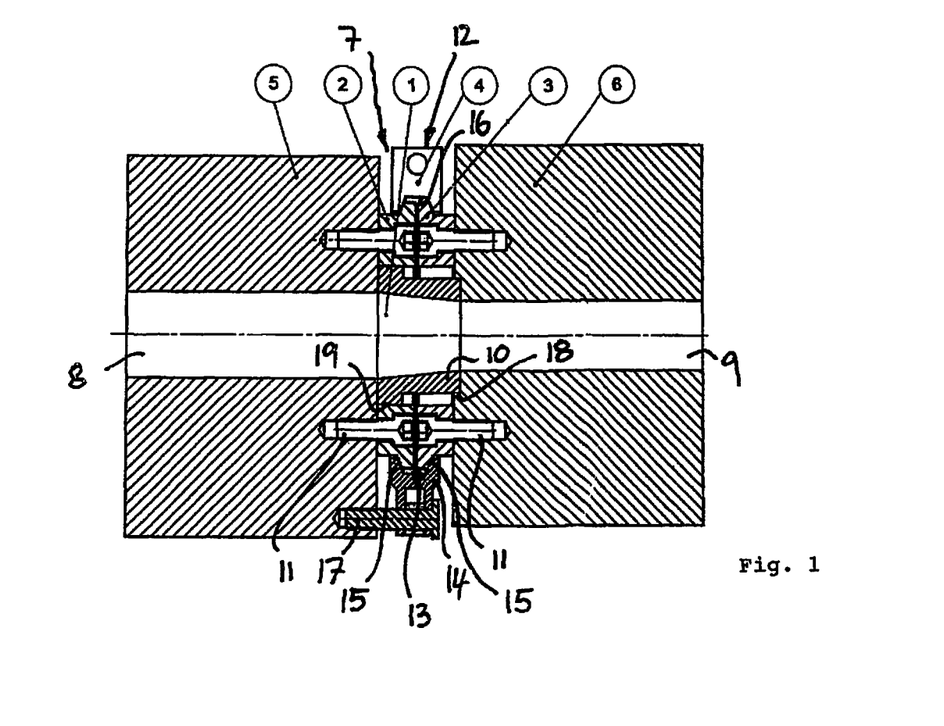
FIG. 1: a longitudinal section through two melt-guiding components and the connection adapter provided therebetween in accordance with an advantageous embodiment of the invention, with the melt-guiding piece of the connection adapter being centered at an adapter half, on the one hand, and at one of the components to be connected, on the other hand.

As FIG. 1 shows, two melt-guiding components 5 and 6 to be connected to one another can each comprise a melt channel 8 and 9 that can have different cross-sectional surfaces and/or different cross-sectional contours, with the left component 5 in FIG. 1 being able to have a melt channel that is larger in cross-section than the right component 6 in FIG. 1. The two melt-guiding components 5 and 6 can form part of a melt processing plant and functional components of such a plant, for example an extruder, a screen changer, a melt pump, a start-up valve and/or a pelletizing head of a pelletizer. Components 5 and 6 can in this respect be heated electrically and/or with thermal oil and/or with another heating, with a control device, in particular a temperature regulator, being able to be provided in order, for example, to carry out a temperature control or a temperature regulation at the components 5 and 6 via thermal sensors.

The named melt-guiding components 5 and 6 are advantageously aligned with their named melt channels 8 and 9 flush with one and are connected to one another in this context by the connection adapter 7. To connect the two melt channels 8 and 9 of the two components 5 and 6, a melt-guiding piece 10 is provided here that—roughly speaking—forms an annular sleeve and has a melt channel 1 that merges the cross-section of the melt channel 8 of the one component 5 contour-wise into the cross-section of the melt channel 9 of the other component 6, with this, as FIG. 1 shows, for example, being able to be a conical channel tapering or a conical cross-sectional transition.

The two components 5 and 6 are in this respect tensioned at the end face against the oppositely disposed end faces of the melt-guiding piece 10 to ensure a tight transition of the melt channels into one another. The end faces of the melt-guiding piece 10 can in this respect have a planar contour in a plane perpendicular to the direction of flow or to the longitudinal axis of the melt-guiding piece 10. The components 5 and 6 can also have a planar contour at the surrounding sections that surround the openings of the melt channels 8 and 9 so that the components 5 and 6 can be tensioned with an exact fit against the end faces of the melt-guiding piece 10.

Two adapter halves 2 and 3 are provided here for a mechanical connection of the two components 5 and 6 and for a firm tensioning of the melt-guiding piece 10, with said adapter halves being formed separately from the melt-guiding piece 10 and forming a sleeve together that surrounds the melt-guiding piece 10.

The adapter halves 2 and 3 can here each form an adapter ring that can be fastened around the melt-guiding piece 10 to the end face of the respective component 5 and 6.

The adapter halves 2 and 3 can here each be fastened, in particular rigidly fastened, in a shape-matching and/or force-fitting manner by means of connection means 11, for example in the form of stud bolts, to the respective component 5 and 6.

When the two components 5 and 6 are aligned with one another in accordance with their intended purpose, the two adapter halves 2 and 3 contact one another back to back and form the common sleeve that surrounds the melt-guiding piece 10.

To be able to connect the two adapter halves 2 and 3 to one another, connection means 12 are provided that, in an advantageous further development of the invention, form a tensioning connection and/or a clamping connection by means of which the two adapter halves 2 and 3 can be tensioned with one another and/or can be clamped with one another.

The tensioning connection and/or clamping connection can advantageously comprise a wedge bead 13 that is provided at the peripheral side at the adapter halves 2 and 3 and onto which a tensioning ring 14 can be tensioned.

The named wedge bead 13 can here comprise two wedge bead halves of which a respective one is provided at one of the adapter halves 2 and 3. When the two adapter halves 2 and 3 are aligned with one another in accordance with their intended purpose, the two wedge bead halves come to lie back to back to one another so that wedge flanks 15 of the wedge bead halves extend toward oppositely disposed sides.

The named wedge bead 13 can form an annular bead that can extent in a plane perpendicular to the longitudinal axis of the melt-guiding piece 10.

The tensioning ring 14 advantageously has a wedge surface groove 16 at the inner peripheral side that comprises two lateral wedge flanks by which the wedge surface groove 16 can be placed with an exact fit onto the wedge surfaces 15 of the wedge bead 13, cf. FIG. 1.

The named tensioning ring 14 an here be slit or in multiple pieces and/or can be compressible or variable with respect to the cross-sectional opening in a different manner. If the tensioning ring 14 is compressed or tightened, the wedge surface groove 16 of the tensioning ring 14 is tensioned with the wedge bead 13 of the adapter halves 2 and 3 so that the adapter halves 2 and 3 are not only held radially to one another, but are also pulled toward one another and/or tensioned against one another axially, i.e. in the longitudinal direction of the melt-guiding piece 10. This axial tensioning of the adapter halves 2 and 3 results in an axial firm tensioning of the components 5 and 6 against the end faces of the melt-guiding piece 10.

As FIG. 1 shows, the tensioning ring 14 can be fastened to one of the components 5 by fastening means 17, for example to prevent the tensioning ring 14 from falling down on an opening of the tensioning ring 14.

As FIG. 1 shows, the melt-guiding piece 10 is centered in a radial direction or transversely to its longitudinal axis. For this purpose, on the one hand, a centering surface is provided at the component 6 so that the end section of the melt-guiding piece 10 facing this component 6 is centered. This centering surface 18 can, for example, be a centering bore in the end face of the component 6, but can also be configured in the form of another centering projection and/or of a centering cut-out.

On the other hand, an oppositely disposed end section of the melt-guiding piece 10 is centered at a centering surface 19 that can be provided at the adapter half 2 provided there. For example, an inner peripheral surface of the adapter half 2 can form this centering surface 19 at which an outer peripheral surface of the melt-guiding piece 10 can be centered.

Figure 2:
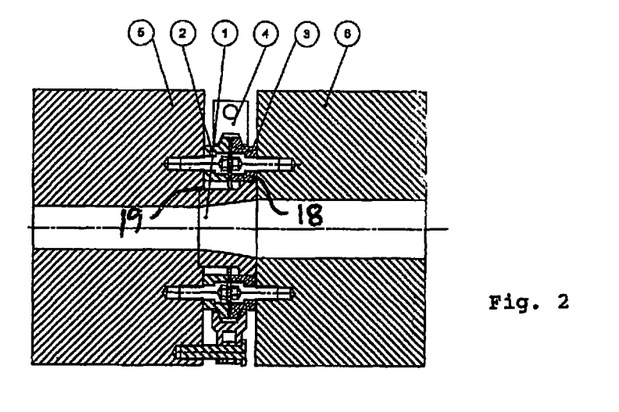
FIG. 2: a longitudinal section through two melt-guiding components and a connection adapter provided therebetween similar to FIG. 1 in accordance with a further embodiment of the invention in accordance with which the melt-guiding pieces is centered at the component disposed opposite—in comparison with the embodiment in accordance with FIG. 1.

As FIG. 2 shows, the centering surfaces 18 and 19 can also be reversed, i.e. the centering surface 19 at the left in the Figures can be provided at the component 5 while the right end of the melt-guiding piece 10 in the Figures can be centered by a centering surface 18 at the adapter half 3.

Figure 3:
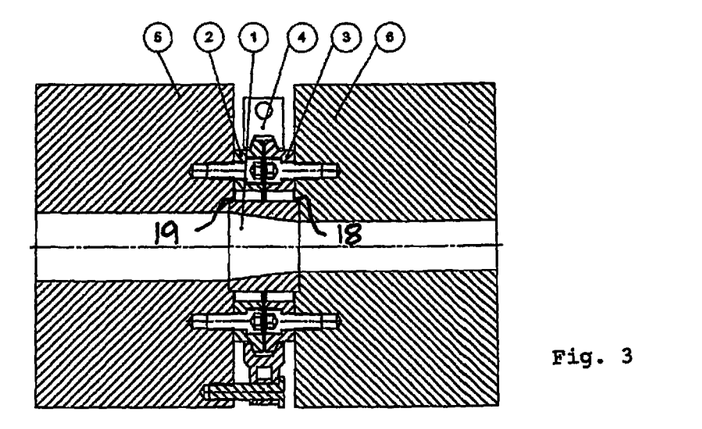
FIG. 3: a longitudinal section through two melt-guiding components and the connection adapter provided therebetween similar to the preceding Figures in accordance with a further embodiment in accordance with which the melt-guiding piece is centered at both oppositely disposed components, but is not centered at the adapter halves.

As FIG. 3 shows, however, both centering surfaces 18 and 19 can also be provided directly at the components 5 and 6. Provision can be made in this case that there is no contact or no direct connection between the adapter halves 2 and 3, on the one hand, and the melt-guiding piece 10, on the other hand. The two adapter halves 2 and 3 only serve the mechanical connection of the two components 5 and 6 to one another and the axial firm tensioning of the components 5 and 6 against the melt-guiding piece 10.

Figure 4:
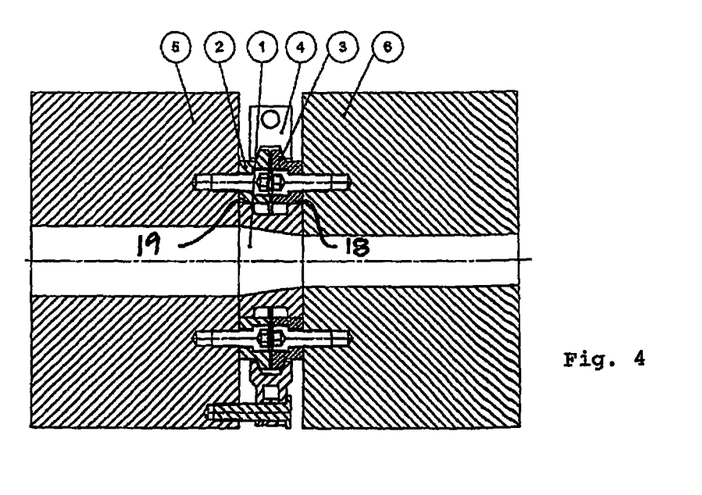
FIG. 4: a longitudinal section through two melt-guiding components and the connection adapter provided therebetween similar to the preceding Figures in accordance with a further embodiment of the invention in accordance with which the melt-guiding piece is centered at both adapter halves.

As FIG. 4 shows, however, both centering surfaces 18 and 19 can also be provided at the two adapter halves 2 and 3. In this case, no centering surfaces need to be provided at the two components 5 and 6 themselves.

Figure 5:
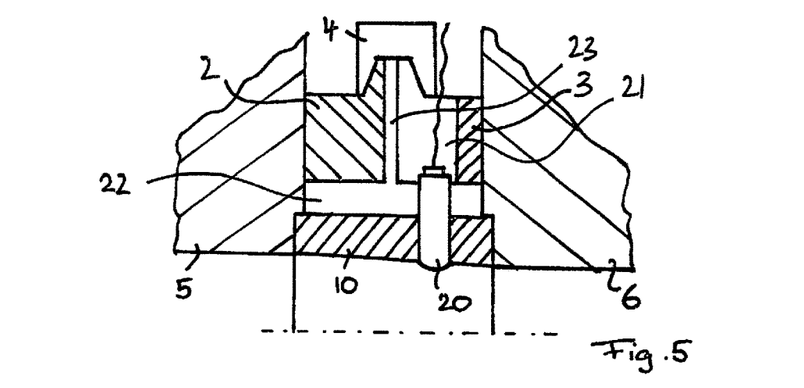
FIG. 5: a half-sectional view of a connection adapter in accordance with a further embodiment of the invention in which a melt probe is provided at the melt-guiding piece and one of the adapter halves has a slit-shaped passage cut-out to lead through the signal cable.

As FIG. 5 shows, at least one melt probe can also be provided at the melt-guiding piece 10 and, for example, a melt temperature and/or a melt pressure and/or a melt mass volume flow of the melt flowing through the melt-guiding piece 10 can be determined with its aid. The melt probe 20 can, for example, extend transversely through the melt-guiding piece 10 and can have a sensor head that is approximately flush with the inner peripheral wall, but optionally also projects inwardly and that can come into contact with the melt.

The melt-guiding piece 10 can for this purpose have a suitable cut-out to receive such a melt probe 20.

One of the adapter halves 3 can advantageously have a probe cut-out 21 through which the melt probe 20 and/or a signal cable connected thereto, can be led, cf. FIG. 5. The named cut-out 21 can be formed, for example, in the form of a passage cut-out that is in the form of a longitudinal groove or of a slit, that, for example, extends radially, and that can be open toward an axial end face of the adapter half.

Figure 6:
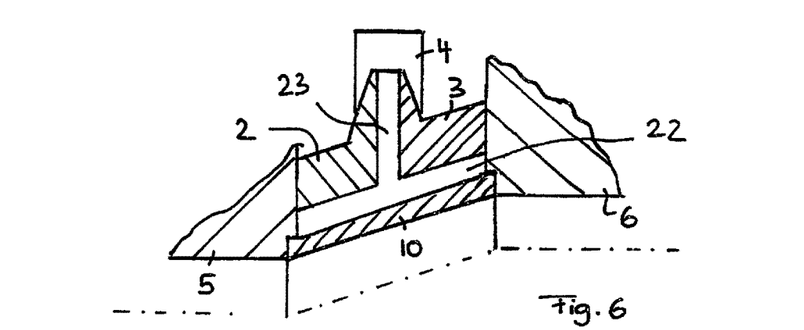
FIG. 6: a half-sectional view of a connection adapter in accordance with a further embodiment of the invention in which the connection piece and the two adapter halves have an eccentric offset to connect components to one another whose melt channels are vertically or transversely offset to one another.

As FIG. 6 shows, the connection adapter can be configured to compensate a vertical and/or transverse offset between the melt channels of the components 5 and 6 to be connected. The melt-guiding piece 10 can have opening cross-sections offset eccentrically from one another for this purpose. As the embodiment in accordance with FIG. 6 shows, the melt-guiding piece 10 can here have an approximately straight extent, with the ends of the melt-guiding piece 10 each being able to be cut to length at an acute angle to the longitudinal axis of the melt-guiding piece 10 so that the opening cross-sections of the melt-guiding pieces 10 extend in planes that are inclined at an acute angle or at an obtuse angle to the longitudinal axis of the melt-guiding piece 10. The opening cross-sections are here advantageously inclined in opposite senses with respect to the longitudinal axis and/or are arranged in mutually parallel planes, cf. FIG. 6.

The adapter halves 2 and 3 can be formed correspondingly eccentrically, cf. FIG. 6.

Figure 7:
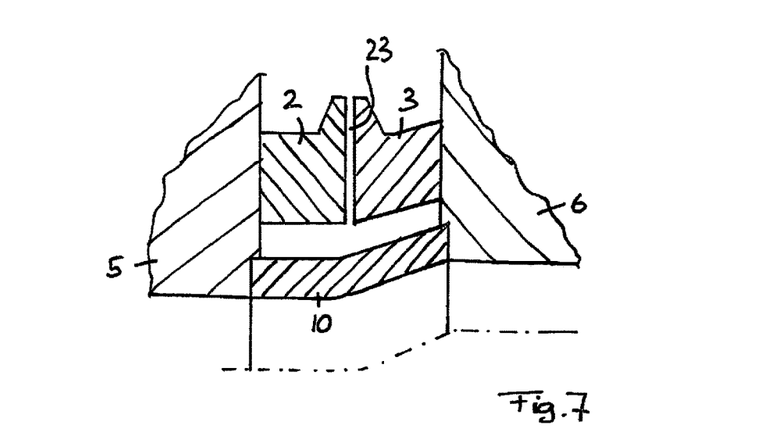
FIG. 7: a half-section of a connection adapter in accordance with a further embodiment of the invention in which the melt-guiding piece likewise has an eccentric offset similar to the embodiment in accordance with FIG. 6, but with only one of the adapter halves having a corresponding eccentric offset, while the other adapter half is a "normal" adapter half without eccentricity.

As FIG. 7 shows, it can, however, also be sufficient if only one of the adapter halves 3 is configured as eccentric while the other adapter half 2 can be configured without a transverse offset—that is, for example, in accordance with the embodiment of FIG. 5. As FIG. 7 likewise shows, the melt-guiding piece 10 can also be kinked or slightly cropped to the achieve the required eccentricity and can have a curved and/or kinked melt flow channel.

The invention claimed is:

1. A connection adapter for connecting two melt-guiding components (5, 6) having two adapter halves (2, 3) that are provided to mechanically connect the two melt-guiding components (5, 6) to one another and that each have connection means (11) for connecting to a respective one of the components (5, 6), having connection means (12) for connecting the two adapter halves (2, 3) to one another, and having a melt-guiding piece (10) that has two opening cross-sections differing from one another and/or offset eccentrically from one another and that is adapted to a first one of the melt-guiding components (5) by a first opening cross-section and to a second one of the two melt-guiding components (6) by a second opening cross-section, characterized in that the melt-guiding piece (10) is formed separately from the adapter halves (2, 3) and is tensionable at its oppositely disposed end faces against the melt-guiding components (5, 6) by the mutually connected adapter halves (2, 3).

2. A connection adapter in accordance with claim 1, wherein the adapter halves (2, 3) together form a sleeve that surrounds the melt-guiding piece (10).

3. A connection adapter in accordance with claim 1, wherein at least one of the adapter halves (2, 3) has a centering surface (18, 19) at which the melt-guiding piece (10) is centered transversely to its longitudinal axis.

4. A connection adapter in accordance with claim 1, wherein an air gap (22) and/or a thermal insulation is/are provided between the melt-guiding piece (10) and the adapter halves (2, 3); and/or wherein the melt-guiding piece (10) is thermally insulated with respect to the adapter halves (2, 3).

5. A connection adapter in accordance with claim 1, wherein an air gap (23) and/or a thermal insulation is/are provided between the adapter halves (2, 3); and/or wherein the adapter halves (2, 3) are thermally insulated.

6. A connection adapter in accordance with claim 1, wherein the connection means (12) for connecting the adapter halves (2, 3) to one another comprise a tensioning and/or clamping connection between the adapter halves (2, 3).

7. A connection adapter in accordance with claim 6, wherein the connection means (12) for connecting the adapter halves (2, 3) to one another comprise a wedge bead (13) at the peripheral side at the adapter halves (2, 3) and a tensioning ring (14) tensionable onto the wedge bead (13).

8. A connection adapter in accordance with claim 7, wherein the wedge bead (13) has two wedge bead halves of which one is provided at one of the adapter halves (2) and the other is provided at the other adapter half (3), with the two wedge bead halves being arranged adjacent to one another with a mutual alignment of the adapter halves (2, 3) in accordance with their intended purpose back to back with one another with wedge surfaces facing away from one another.

9. A connection adapter in accordance with claim 7, wherein the tensioning ring (14) has a wedge surface groove (16) at the inner peripheral side that can be placed onto the wedge bead (13) of the adapter halves (2, 3) and can be wedged with the wedge bead (13) by compressing the tensioning ring (14).

10. A connection adapter in accordance with claim 8, wherein the wedge groove (13) and/or the tensioning ring (14) extends/extend in a plane that is aligned perpendicular to the longitudinal axis of the melt-guiding piece (10).

11. A connection adapter in accordance with claim 8, wherein the wedge bead (13) and the tensioning ring (14) are configured and adapted to one another such that the adapter halves (2, 3) can be axially tensioned with respect to one another by a radial tensioning of the tensioning ring (14) against the wedge bead (13).

12. A connection adapter in accordance with claim 1, wherein the tensioning ring (14) has fastening means (17) for fastening to one of the melt-guiding components (5, 6).

13. A connection adapter in accordance with claim 1, wherein the melt-guiding piece (10), on the one hand, and the adapter halves (2, 3), on the other hand, consist of different materials having different thermal coefficients of expansion.

14. A connection adapter in accordance with claim 1, wherein the melt-guiding piece (10) has a greater thermal expansion than the adapter halves (2, 3) such that on a heating of the melt-guiding piece (10) by melt, the melt-guiding piece (10) is tensioned against the melt-guiding components (5, 6).

15. A connection adapter in accordance with claim 14, wherein at least one of the adapter halves (2, 3) has a centering surface (18, 19) at which the melt-guiding piece (10) is centered transversely to its longitudinal axis and is tensionable against the at least one centering surface (18, 19) by thermal expansion.

16. A connection adapter in accordance with claim 1, wherein the melt-guiding piece (10) consists of a plurality of materials having different thermal coefficients of expansion.

17. A connection adapter in accordance with claim 1, wherein the melt-guiding piece (10) has a multilayer design and/or is provided with at least one coating, in particular has a thermally insulating and/or stiction-reducing and/or corrosion-inhibiting coating.

18. A connection adapter in accordance with claim 1, wherein the opening cross-sections of the melt-guiding piece (10) differ from one another in their cross-sectional surface and/or cross-sectional contour.

19. A connection adapter in accordance with claim 18, wherein the melt-guiding piece (10) has a melt channel (1) tapering or flaring from the one side to the other side of the melt-guiding piece (10) and/or has a melt channel (1) changing in cross-sectional form, in particular merging from round to angled or from circular to oval.

20. A connection adapter in accordance with claim 1, wherein the mutually offset opening cross-sections are formed by an oblique cutting to length of the ends of the melt-guiding piece (10) and/or by a melt-guiding piece section cropped and/or curved in S shape.

21. A connection adapter in accordance with claim 1, wherein at least one of the adapter halves (3) has connector and/or connection sections offset eccentrically from one another.

22. A connection adapter in accordance with claim 1, wherein the melt-guiding piece (10) has at its oppositely disposed end sections a respective centering surface for centering the melt-guiding piece (10) transversely to its longitudinal axis at a respective one centering surface (18, 19) at one of the melt-guiding components (5, 6) and/or at one of the adapter halves (2, 3), with the centering surfaces of the melt-guiding pieces (10) preferably forming outer peripheral surfaces of the melt-guiding piece (10).

23. A melt-processing plant comprising two melt-guiding components (5, 6) that are connected to one another by a connection adapter (7) configured in accordance with claim 1.

24. A melt-processing plant in accordance with claim 23, wherein at least one of the melt-guiding components (5, 6) has a centering surface (18, 19) for centering the melt-guiding piece (10) of the connection adapter (7) transversely to the longitudinal axis of the melt-guiding piece (10).

25. A melt-processing plant in accordance with claim 23, wherein the two melt-guiding components (5, 6) have a vertical and/or transverse offset from one another; and/or wherein the melt channels are arranged vertically and/or transversely offset from one another in the melt-guiding components (5, 6) to be connected to one another.

* * * * *